(12) United States Patent
Nielsen

(10) Patent No.: US 7,332,827 B2
(45) Date of Patent: Feb. 19, 2008

(54) METHOD FOR CONTROLLING A POWER-GRID CONNECTED WIND TURBINE GENERATOR DURING GRID FAULTS AND APPARATUS FOR IMPLEMENTING SAID METHOD

(75) Inventor: John Godsk Nielsen, Hornslet (DK)

(73) Assignee: Vestas Wind Systems A/S, Randers (DK)

( * ) Notice: Subject to any disclaimer, the term of this patent is extended or adjusted under 35 U.S.C. 154(b) by 0 days.

(21) Appl. No.: 10/544,639

(22) PCT Filed: Feb. 7, 2003

(86) PCT No.: PCT/DK03/00078

§ 371 (c)(1),
(2), (4) Date: Apr. 12, 2006

(87) PCT Pub. No.: WO2004/070936

PCT Pub. Date: Aug. 19, 2004

(65) Prior Publication Data

US 2006/0238929 A1    Oct. 26, 2006

(51) Int. Cl.
*F03D 9/00* (2006.01)
*H02P 9/04* (2006.01)
*H02P 9/00* (2006.01)

(52) U.S. Cl. ............. 290/55; 290/44; 322/44
(58) Field of Classification Search ........... 290/44, 290/55; 416/7, 132 B; 415/7, 2.1, 4.2, 4.5; 60/398; 322/44
See application file for complete search history.

(56) References Cited

U.S. PATENT DOCUMENTS

| 4,461,957 | A | * | 7/1984 | Jallen | 290/44 |
| 5,321,308 | A | * | 6/1994 | Johncock | 290/40 C |
| 5,798,632 | A | * | 8/1998 | Muljadi | 322/29 |
| 6,239,511 | B1 | * | 5/2001 | Joho | 307/38 |

(Continued)

FOREIGN PATENT DOCUMENTS

DE    10117212 A1 * 10/2002

(Continued)

*Primary Examiner*—Julio C. Gonzalez
(74) *Attorney, Agent, or Firm*—Stites & Harbison PLLC; Ross F. Hunt, Jr.

(57) ABSTRACT

The present invention relates to a method and an apparatus for controlling a power-grid connected wind turbine generator during grid faults. During grid faults, the stator windings of the wind turbine generator are disconnected from the power grid and impedances for dissipating at least part of the power generated by the wind turbine during grid fault condition are connected to the stator windings. In this way, a certain magnetisation of the generator can be maintained and after removal of the grid fault condition, the generator is synchronised to the power grid and the impedances are disconnected and the stator windings are reconnected to the power grid. In this way, it is possible to keep the wind turbine generator at least partly magnetised during grid faults and thus ready for delivering power to the power grid, as soon as the grid voltage is re-established after the fault.

10 Claims, 2 Drawing Sheets

U.S. PATENT DOCUMENTS

| | | | |
|---|---|---|---|
| 6,255,805 B1 * | 7/2001 | Papalia et al. | 323/207 |
| 6,304,006 B1 * | 10/2001 | Jungreis | 307/64 |
| 7,068,015 B1 * | 6/2006 | Feddersen | 322/89 |
| 7,078,825 B2 * | 7/2006 | Ebrahim et al. | 290/52 |
| 7,122,916 B2 * | 10/2006 | Nguyen et al. | 307/57 |
| 2003/0151259 A1 * | 8/2003 | Feddersen et al. | 290/44 |
| 2004/0008010 A1 * | 1/2004 | Ebrahim et al. | 322/44 |
| 2005/0116476 A1 * | 6/2005 | Feddersen | 290/44 |
| 2006/0214428 A1 * | 9/2006 | Altemark et al. | 290/44 |

FOREIGN PATENT DOCUMENTS

| | | |
|---|---|---|
| EP | 0 378 085 A2 | 7/1990 |
| EP | 0 984 552 A2 | 3/2000 |

* cited by examiner

METHOD FOR CONTROLLING A POWER-GRID CONNECTED WIND TURBINE GENERATOR DURING GRID FAULTS AND APPARATUS FOR IMPLEMENTING SAID METHOD

TECHNICAL FIELD

The present invention relates to a method for controlling a power-grid connected wind turbine generator during grid faults of the kind set forth in the preamble of claim 1.

BACKGROUND ART

In wind turbine systems it is known to provide some kind of control of the wind turbine during grid faults. However, the general concept of such control apparatus aims at stopping the wind turbine by pitching the blades of the wind turbine out of the wind and disconnecting the generator from the grid. After a certain time, when the grid voltage has been re-established, the wind turbine is started up in the normal fashion in order to deliver power to the grid, and the time from disconnection to re-start of the wind turbine has traditionally been in the order of 1-10 minutes. The short circuit current contribution from the wind turbine generator has generally been limited to last approximately 40-50 ms, after which the current from the wind turbine generator has been zero. Thus, the wind turbine generator does not contribute to the re-establishment of the grid voltage and does not contribute to the short circuit current in the grid over a longer period of time, which may be necessary in order to activate the grid protection means for disconnecting the faulty parts of the power grid.

DISCLOSURE OF THE INVENTION

It is the object of the present invention to provide a method for controlling a power-grid connected wind turbine generator during grid faults of the kind referred to above, with which it is possible to keep the wind turbine generator magnetised and ready for delivering power to the power grid, as soon as the grid voltage is re-established after the fault, and this object is achieved with a method for controlling a power-grid connected wind turbine generator during grid faults of said kind, which according to the present invention also comprises the features set forth in the characterising clause of claim 1. With this method, it is possible to dissipate the generated power in the impedances, whenever the generated power cannot be delivered to the power grid, due to fault conditions, such as low voltages or zero voltages on the power grid, and as soon as the power grid is re-established, the wind turbine generator can be re-connected to deliver the power to the power grid almost instantaneously.

Preferred embodiments of the method according to the invention, the advantages of which will be evident from the following detailed description, are revealed in the sub-ordinate claims.

BRIEF DESCRIPTION OF THE DRAWINGS

In the following detailed part of the present description, the invention will be explained in more detail with reference to the exemplary embodiments of different apparatus for implementing the method for controlling a power-grid connected wind turbine generator during grid faults according to the invention shown in the drawings, in which FIG. 1 schematically shows a power-grid connected wind turbine generator comprising a double-fed asynchronous generator, in which the rotor is connected to the power grid through a back-to-back converter for transferring energy between the rotor windings and the power grid, FIG. 2 schematically shows a possible connection system for connecting the impedances to the terminals of the wind turbine generator, with possibilities of connecting the generator in star and delta configuration, FIG. 3 schematically shows another possible arrangement of the connection system for the impedances, in which the impedances can be connected in series between the generator terminals and the power grid, and with possibilities of connecting the generator and the impedances in star and delta configurations, FIG. 4 schematically shows a power-grid connected wind turbine generator comprising a double-fed asynchronous generator, in which the rotor is connected to electronically controlled resistors in order to provide a control of the rotor resistance and a corresponding control of the slip of the generator, and FIG. 5 schematically shows a power-grid connected wind turbine generator comprising a generator with a so-called short-circuit rotor.

DESCRIPTION OF THE PREFERRED EMBODIMENTS

Figure 1:
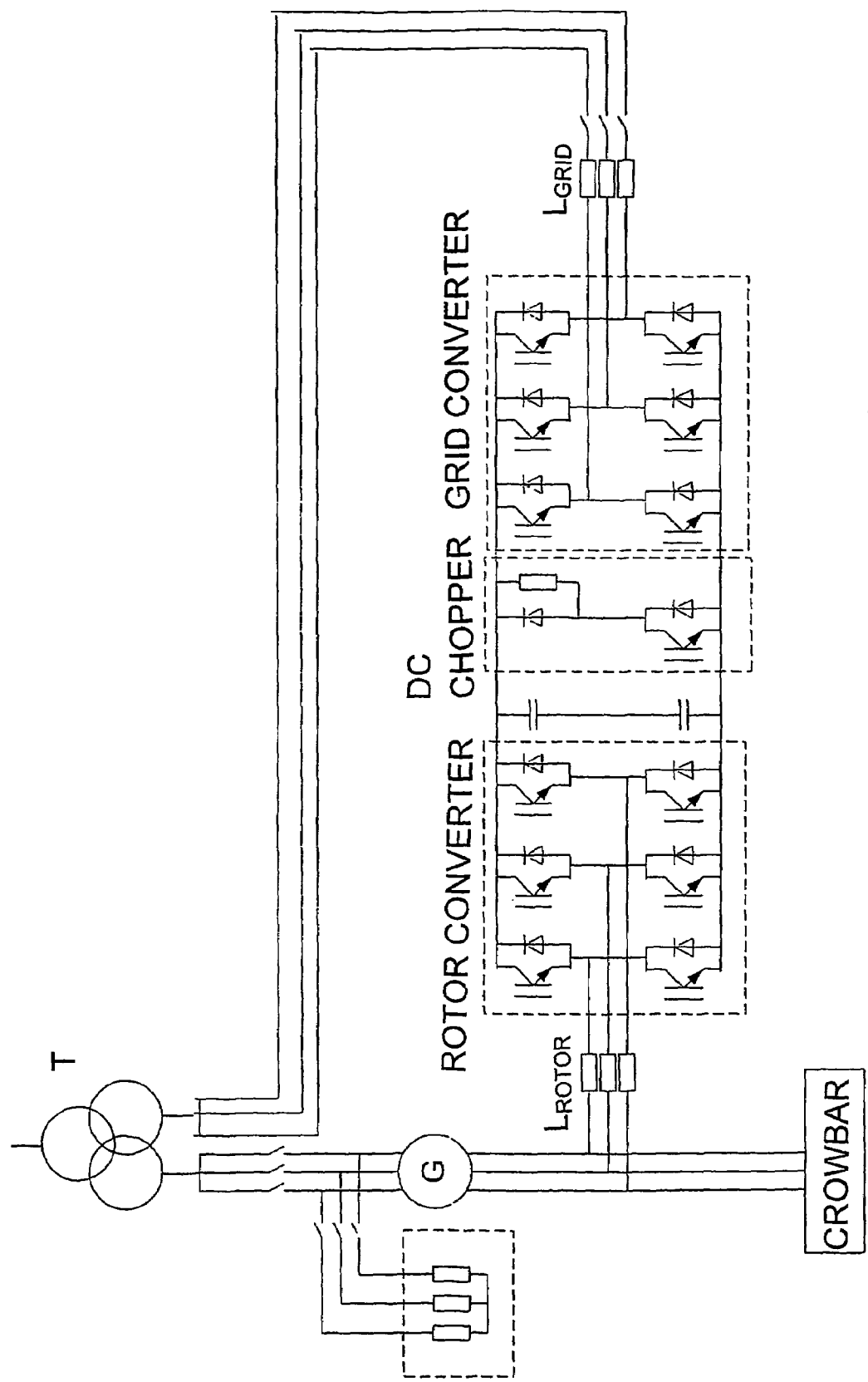

The wind turbine generator system shown in FIG. 1 comprises a double-fed asynchronous generator G, the stator windings of which are normally connected through a contactor to the grid indicated by the transformer T. In order to be able to control the generated power from the generator G, the rotor windings are connected to a back-to-back converter comprising a rotor converter, an intermediate DC circuit and a grid converter connected to the power grid via the transformer T. By suitable control of the rotor converter and the grid converter, the power generation from the generator G can be controlled in frequency, active power, reactive power, voltage, etc.

In case of a grid fault, causing a substantial decrease in the voltage on the power grid, this voltage reduction results in a de-magnetisation of the generator and corresponding high currents delivered from the stator windings to the grid and in the rotor windings. However, the rotor converter and grid converter are normally not dimensioned to such high currents and accordingly, a crowbar or similar circuit is connected to the rotor windings and is activated, whenever high currents are detected in connection with e.g. grid faults. After the demagnetisation of the generator G, the stator windings are disconnected from the power grid and connected to stator impedances, providing a load on the generator stator windings in such a way that the mechanical energy provided from the wind turbine blades to the generator can be dissipated in these impedances. After disconnection of the stator windings from the power grid, the crowbar is disabled and the rotor converter resumes operation controlling the magnetisation of the generator and the power delivery from the stator windings to the impedances connected thereto. Possible energy delivery from the rotor windings towards the intermediate DC circuit may be transmitted further on to the grid through the grid converter, in case a certain grid voltage is present, and vice versa power may be delivered from the grid to the intermediate DC circuit. In case the power delivery from the rotor windings cannot be dissipated by the grid converter connected to the power grid, a DC chopper can be inserted in the intermediate DC circuit, which is able to dissipate possible surplus power.

During the fault conditions, the grid converter is preferably controlled to circulate reactive short-circuit power towards the grid, and this power is only limited by the nominal power of the grid converter. As mentioned above, the power for covering the losses in the system can either be delivered from a residual voltage on the power grid or by connecting the generator in such a way that the stator windings are more or less short-circuited and the power being delivered from the rotor windings through the rotor converter.

As mentioned above, and explained in more detail in the following, the short-circuiting of the stator windings can be performed more or less directly, with or without impedances inserted in the stator circuit. Furthermore, as also explained in more detail in the following, the short-circuiting of the stator including stator impedances can be performed with the stator windings in star or delta configuration and with the corresponding impedances in corresponding star or delta configuration. In this way, the configuration of the stator windings and the stator impedances can be chosen in such a way that a suitable power dissipation can be achieved and a major part of the power delivered from the wind can be dissipated in the impedances, thus avoiding a substantial acceleration of the wind turbine. Furthermore, the short-circuiting of the stator windings provides the possibility of delivering active and reactive power to the grid from the rotor windings through the back-to-back converter.

Under circumstances, in which the risk of over-speeding is low, it may be possible to magnetise the generator to approximately 60-100% of rated voltage and to an amplitude and angle, at which the return of the grid voltage is expected. In this way, the time for synchronisation is reduced and the stator windings can be reconnected immediately after return of the grid voltage, in which situation the stator winding voltages are close to the grid voltages. After the reconnection, the active and reactive power can quickly be changed to the values present before the grid fault.

During the fault, the speed of the wind turbine can be controlled by dissipating power in the stator-connected impedances and possibly in the chopper resistance in the intermediate DC circuit. Accordingly, the pitching control is primarily only used if the rotational speed becomes critical and/or the grid faults and corresponding voltage reduction is of a longer lasting character.

During the grid faults, a rotational speed of the wind turbine can be controlled by means of the pitch system and the rotor converter, and this control can also be used for reducing the torsional oscillations on the rotor shaft. Such reduction of the increase in speed and variations in speed makes the re-synchronisation easier. The power transmitted to the intermediate DC circuit from the rotor windings through the rotor converter during deceleration of the generator, can be dissipated in the DC chopper or possibly be transmitted to the power grid, in case a residual voltage is present therein.

Figure 2:
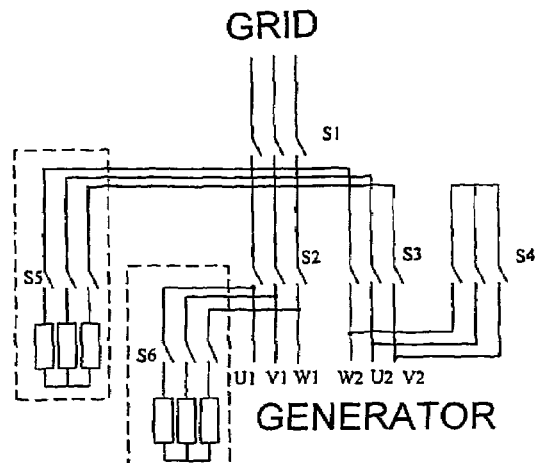

The system for connecting the impedances to the stator windings of the generator shown in FIG. 2 comprises the normally installed contactors S1, S3, S4 for providing the possibility of disconnecting the generator from the grid (S1) and for connecting the stator windings in star (S2, S4) and delta (S2, S3) configuration. FIG. 2 shows two different possibilities for connecting the impedances, using contactors S5 and S6, respectively, for connecting the impedances coupled in a star configuration across the stator windings of the generator, said generator windings being switchable between a star and delta configuration, respectively. The short circuit of the stator windings can be kept separate from the primary current connection, whereby dimensioning of the contactors and wires can be reduced. In FIG. 2, the short circuit can be provided by closing S5 and S4 and opening S1, whereby the stator is coupled in a star configuration. The short circuit can also be provided by opening S1 and closing S2, S3 and S5, whereby the stator is in a delta configuration. A further possibility of providing the short-circuiting is to open S2 and S3 and closing S4 and S6, again providing a star configuration of the impedances and the stator windings. A direct short-circuiting of the stator windings can be provided by means of the contactors S2, S3, S4, which closing at the same time and opening of S1 will provide a direct short circuit of the stator windings. Yet a further possibility provided by the configurations shown in FIG. 2 is a configuration, in which the impedances are coupled in series with the stator windings, and in which the stator windings are connected to the grid. This is provided by closing S6, S3 and S1 and opening S2, S4 and S5. This configuration can be used during disconnecting from the grid and/or during reconnection to the grid.

Figure 3:
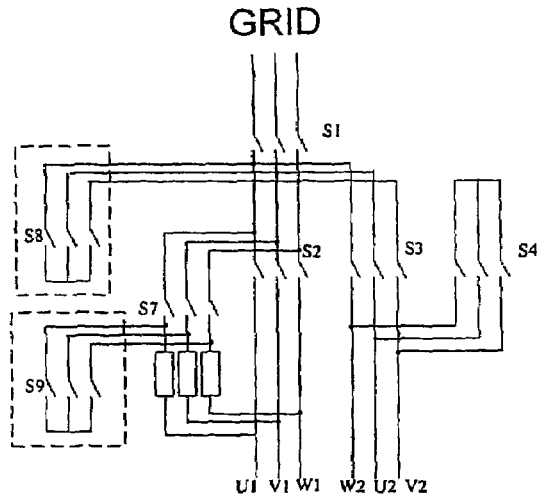

The arrangement shown in FIG. 3 provides other possibilities for the connection of the impedances. Opening S2 inserts the impedances in series with the stator winding terminals U1, V1, W1 by closing S7, and closing S3 or S4 connects the stator windings in delta or star configuration, respectively. Maintaining S1 closed and S8 and S9 opened, active and reactive power can be delivered to the grid, and this power can be controlled if the generator is a double-fed asynchronous generator, as shown in FIG. 1, by controlling the back-to-back converter. A short-circuiting of the stator windings across the impedances can be provided by opening S1 and closing S8. In this configuration, both the impedances and the stator windings can be coupled between star and delta configuration by means of the contactors S3, S4, S7, S9.

In a situation where fast re-establishment of the active power has high priority, power electronic switches may be inserted instead of contactors, in connection with the stator windings. Such switching elements can be provided in such a way that they are primarily active during fault conditions, to provide a soft and fast reconnection of the generator windings. As soon as the wind turbine is in a normal condition, the power electronic switches may be short-circuited by means of contactors.

Figure 4:
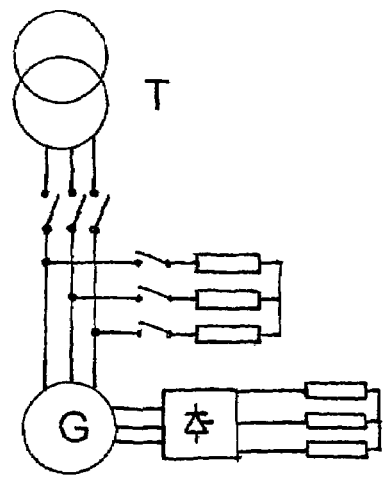

Above, the invention has been described in connection with a preferred embodiment thereof, but for a man skilled in the art it is evident that the invention can also be used in connection with a wind turbine generator as shown in FIG. 4, in which the rotor windings are connected to an electronically controlled impedance in order to provide the possibility of optimising the slip of the generator during operation. Also in this connection, it is possible to keep the generator at least partly magnetised during fault conditions by disconnecting the stator windings from the grid and connecting impedances to the disconnected stator windings.

Figure 5:
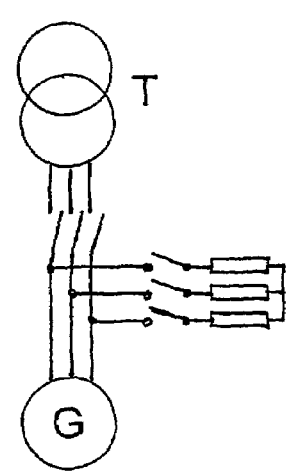

Furthermore, the invention can also be used in connection with a so-called short-circuit rotor generator, as shown in FIG. 5, in which it will also be possible to keep the generator magnetised during fault conditions by disconnecting the stator windings from the grid and connecting suitable impedances to the disconnected stator windings.

In order to improve the synchronisation to the grid, three separate grid voltage measurements and three separate stator voltage measurements can be used and furthermore, an encoder can be provided in order to detect the position of the rotor.

The invention claimed is:

1. A method for controlling a power grid connected to wind turbine generator during grid faults, the generator comprising a rotor driven by a wind turbine and a stator normally connected to the grid, and the stator, during normal operation being connected to deliver power to the power grid, and the generator comprising a double-fed asynchronous generator, the rotor including windings normally connected to the grid through a back-to-back converter so as to transfer energy between the rotor windings and the grid in a controlled manner, said method comprising the steps of:
   a) disconnecting the stator windings from the power grid when a grid fault condition is detected,
   b) connecting the stator windings to impedances for dissipating between 0 and 100% of the power generated by the wind turbine during a grid fault condition,
   c) maintaining a certain magnetization of the generator during a grid fault condition, and
   d) after removal of the grid fault condition, synchronizing the generator with the power grid and disconnecting the impedances and reconnecting the stator windings to the power grid, the method further comprising the step of maintaining the connection of the back-to-back converter to the grid during a grid fault condition and controlling the back-to-back converter so as to deliver a controlled short-circuit contribution to the grid during a grid fault condition.

2. The method in accordance with claim 1, further comprising the steps of connecting the impedances in a star or delta configuration and connecting the stator windings in a star or delta configuration, the connecting steps being dependent on measured parameters for the wind turbine.

3. The method in accordance with claim 1, wherein the double-fed asynchronous generator comprises electronically controlled impedances connected to the rotor windings, the method further comprising the step of controlling the electronically controlled impedances connected to the rotor windings during a fault condition such that a selected magnetization of the generator is maintained during a fault condition.

4. A wind turbine generator connected to a power grid, said generator comprising:
   a wind turbine-driven rotor;
   a stator, said stator, being connected, during normal operation, to deliver power to the power grid,
   means for disconnecting the stator windings from the power grid when a fault condition is detected; and
   means for connecting impedances to the stator windings, said impedances being dimensioned to dissipate between 0 and 100% of the power generated by the wind turbine during a grid fault condition, said generator further comprising means for maintaining a certain magnetization of the generator during disconnection and means for synchronizing the generator with the grid before reconnection to the grid after a fault clearance,
   the generator comprising a double-fed asynchronous generator comprising a back-to-back converter connected between the rotor and the grid, and the means for disconnecting the stator windings from the power grid serving to maintain the connection between the back-to-back converter and the power grid when a fault condition is detected.

5. Apparatus in accordance with claim 4, wherein the means for disconnecting the stator windings from the power grid, and the means for connecting the stator windings to the impedances, comprise contactors.

6. Apparatus in accordance with claim 4, wherein the means for disconnecting the stator windings from the power grid, and the means for connecting the stator windings to the impedances, comprise power electronic switches.

7. Apparatus in accordance with claim 4, further comprising connection means for connecting the impedances and/or the stator windings in a star and/or delta configuration.

8. Apparatus as claimed in claim 7 wherein said connection means comprise contactors.

9. Apparatus as claimed in claim 7 wherein said connection means comprises power electronic switches.

10. Apparatus in accordance with claim 7, further comprising electronically controlled impedances connected to the rotor windings.

* * * * *